Dec 8, 1970 — R. M. PIETRINI — 3,545,847
VISUAL FUSION TRAINING INSTRUMENT
Filed Nov. 27, 1964
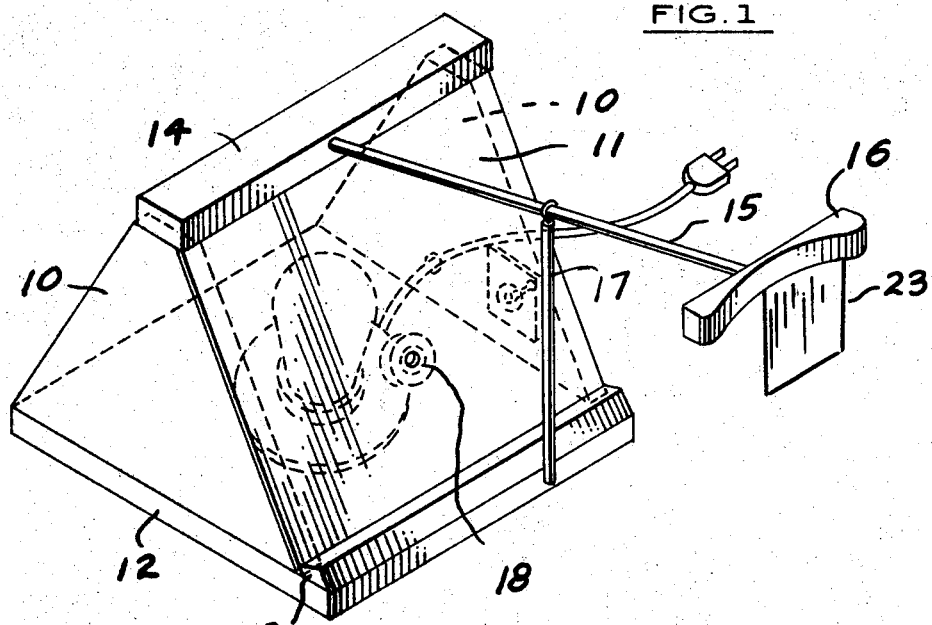
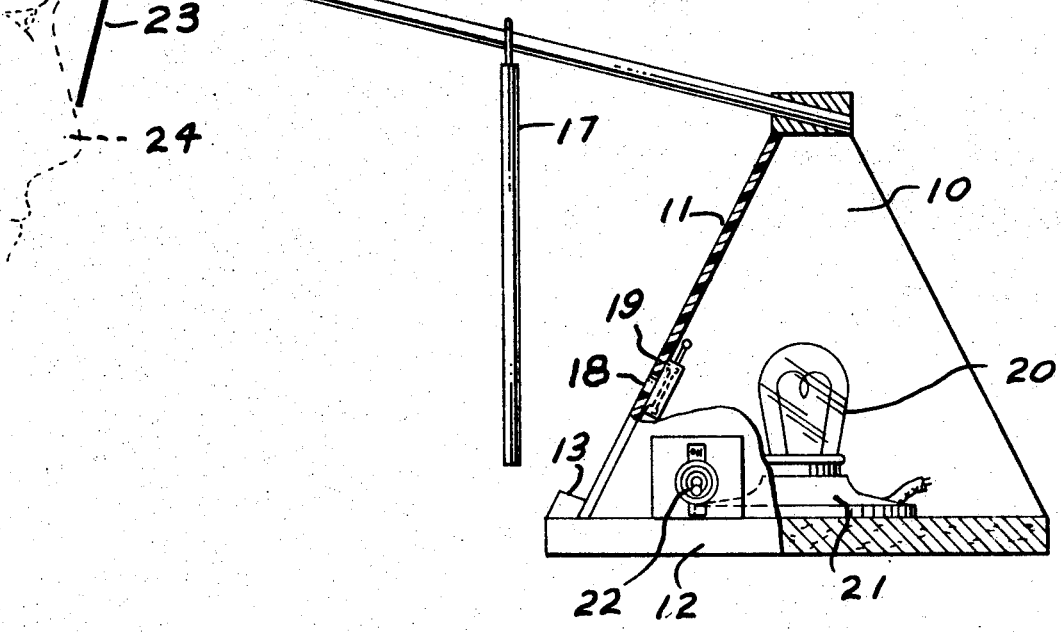
INVENTOR
RACHAEL M. PIETRINI
BY Farley Forster & Farley
ATTORNEYS

United States Patent Office

3,545,847
Patented Dec. 8, 1970

3,545,847
VISUAL FUSION TRAINING INSTRUMENT
Rachael M. Pietrini, 567 Ridgedale,
Birmingham, Mich. 48008
Filed Nov. 27, 1964, Ser. No. 414,112
Int. Cl. A61b *3/08*
U.S. Cl. 351—2                                    10 Claims

ABSTRACT OF THE DISCLOSURE

A fusion training device for detecting binocular vision deficiencies and facilitating corrective eye exercises including a focal light objective for binochlar viewing, a differential color filter for at least one of the eyes to facilitate detection and indentification of subconscious suppression in one of the eyes and a variable auxiliary objective moveable between the first light objective and the viewer to facilitate binocular exercise in focusing on an object of variable distance from the viewer with a conscious differential double image of the first light objective to verify lack of suppression.

---

This invention relates to a visual fusion trainer and more particularly to an instrument for detecting deficiencies in binocular vision, for assisting the user in recognizing the nature and cause of such deficiencies and, to the extent possible through eye exercises, to assist the user in developing efficient, comfortable true binocular vision.

Many visual problems and many children's reading problems previously not associated with visual abnormalities have been traced in recent years to deficiencies in binocular vision which in many cases are correctable, when detected and accurately analyzed, through, the application of appropriate eye exercises. Muscular deficiencies in eye control are not limited to more obvious cases of convergent and divergent strabismus (cross-eyes and walleyes) but in many cases are found in individuals who have apparently normal control and vision in each eye but due to muscular imbalance or improper coordination lack true, efficient, comfortable binocular vision and are retarded or limited by reading and other visual deficiencies of which they and others are unaware. Thus, under normal conditions when an individual looks and directs his vision on a specific object in space or picture or words in books, both eyes focus on the object at the same time. The two images of the object are accepted and blended by the brain into one by the visual process called "fusion." Many individuals for various reasons (lazy eye, need of glasses, eye muscles that are either too weak or too strong) have difficulty or find it uncomfortable to use their two eyes together as a team resulting in early stages as eye strain or blurred images. If using the two eyes together becomes too much of a struggle the individual finds a solution into his problem by giving up all efforts to maintain single *binocular* vision and adapts himself to single *monocular* vision learning to see singly by disregarding one of his two eyes and subconsciously suppressing the image registered thereon.

This present fusion trainer is designed to help the individual become aware of how he is using his eyes and encourages him to make a conscious effort to direct both eyes at the same place at the same time. It helps him to recognize when he is suppressing one eye and thereafter assists him in learning to properly focus with that eye and to accept rather than suppress its image. Then, with practice, he may achieve true binocular vision in the many cases where muscular deficiencies are correctable through conscious properly directed eye exercises. Furthermore, in those cases where physical muscular deficiencies may require surgical correction, the use of the present fusion trainer has been found to be of substantial assistance in retraining the use of the eyes after surgery and the establishing proper visual habits to assure efficient binocular vision.

The preferred embodiment of the present instrument incorporates a chamber which may be placed on a table, housing a screen facing the user with an adjustable lighted aperture as a focal point. A headrest located at a reading distance from the aperture, contoured for registration with the forehead of the user is joined to the housing at a point above the aperture by a central rod, fitted with a depending sliding bar which is movable along the rod. A supplemental focal object such as a letter or word may be placed on the sliding bar for movement toward or away from the eyes. In this manner fusional convergence can be tested through the reactions of the user to varying conditions. He can be caused to see *one* image of the object on the slide bar at the same time he sees a dual image of the lighted aperture (physiological diplopia) which will assist both in analysis and in corrective exercises for fusional deficiencies.

Incorporated in the headrest, or in glasses worn by the user, is a red colored glass or transparency for one of the eyes so that light from the aperture will be seen by one of the eyes as a red light, by the other eye as a white light and by both eyes properly focused on the aperture as a pink light. This instrument facilitates ready detection of suppression, as where only a red light or white light is seen with both eyes open, or improper convergence where the red light and white light are displaced during attempts to focus on the aperture or when red light and white light are not porperly displaced during attempts to focus on the slide object when moved toward the user. With instruction and practice the user may acquire and develop the faculty and habit of proper fusion within the latent capability of the individual to initiate and strengthen proper muscular coordination through conscious programmed eye exercises.

The various objects and techniques applicable in the use of this instrument may best be understood from the following more detailed description of the preferred embodiment with reference to the drawings wherein:

FIG. 1 is a perspective view of the visual fusion training instrument; and

FIG. 2 is a sectional side elevation taken through the center of the instrument.

With reference to the drawings the instrument comprises a chamber having opaque sidewalls 10, an opaque inclined front screen 11, a base 12 fitted with a ledge 13 and top 14. A rod 15 projects angularly upwardly mounting a forehead rest 16 approximately 14 inches from the screen. A vertical slide bar 17 is suspended from the rod 15 adjustable between a central aperture 18 in the screen and the nose of the user. The aperture 18 is preferably approximately ⅜ of an inch in diameter and fitted with an adjustable iris 19 similar to a camera iris for manually reducing the aperture size. A light bulb 20 in a socket 21 is mounted on the base 12 behind the aperture and an on-off switch 22 for controlling same is mounted on one side of the chamber. A red colored transparent viewpiece 23 is attached to one side only of the headrest to permit the viewer 24 to see a red light at the aperture 18 with one eye and a white light with the other.

The instrument has been found particularly effective in the discovery and correction of strabismus deficiencies in children of pre-school or elementary school age, even when response to other approaches has been negative. Accordingly, as an illustration of a technique using the present fusion trainer, a typical routine for use by a young child will be described.

The child is instructed to understand that when he directs his attention to the light with his right eye, the light is seen as red and when he directs his attention to the light with his left eye the light is seen as white. This may be verified by closing one eye at a time or covering it by hand while observing with the other. When the child has definitely established this relationship in each individual eye, he is asked to look at the light with both eyes at the same time and describe what he sees. If his response is "one red light," he should be taught to recognize that seeing one red light means that he is looking through his right eye only and that his left eye is being lazy and falling asleep (suppression is present); if the response is "one white light" he should be taught to recognize that he is seeing through his left eye only and that his right eye is being lazy and falling asleep. If his response is "two lights" (one red and one white) he should be instructed to draw on a piece of paper the two lights as he sees them. Supplied with red crayon and white crayon he may draw the two lights on the piece of paper just as he sees them, thereby indicating the degree and necessary correction of strabismus deficiency. If the response is "one pink light" the child does have the ability to direct both eyes at the light at the same time with some degree of stability and is seeing and blending the one white light together with the one red light in fusing on the light aperture.

When the red and white light are separated the child may be encouraged to try to bring them together by concentrating on the light aperture with each of his eyes, one at a time and then together. Progress may be noted when successive drawings by the child show the light images are moving closer together and the child will be aware of such progress leading to final fusion when within his muscular control capability.

When only one light is seen with both eyes open (red or white rather than pink) the child is encouraged to try to see the light with the suppressed eye while the other eye is also seeing. This may be done, for example, when the left eye is suppressed by asking the child if he can see a white light while rapidly changing the iris opening or snapping the light on and off to attract attention. He is then encouraged to try to retain the white light and blend it with the red to overcome the suppression and attain fusion.

When the child has attained the skill and necessary control of his eyes to perceive the light as a single pink one, he will be ready to be taught the more advanced skills of single binocular vision.

In a typical further procedure a sheet of onion skin is placed over the aperture fixation light with the iris fully opened. With his forehead in the headrest the child is asked to move the slide bar 17 up to his nose and back to the aperture with his left eye covered and his right eye focused on the fixation light throughout movement of the slide. He is then asked to touch the fixation light and is observed by the instructor while the slide bar is moved to and from his nose to make sure his right eye is steadily centrally focused on the fixation light. He should practice this until he can move the slide bar directly out and in without moving it from right to left. The instructor should also observe that the head is held straight and steady so that the slide bar always touches the tip of the nose on the inward pull. The child is directed to observe that as he is steadily looking at the light that he can also see the bar as he moves it withoutmoving his eye. His attention should be called to the fact that as he pushes the bar out toward the fixation light it is always seen to the left of the light and that it never crosses over the light to the right side. The bar is then placed half-way between the nose and fixation light and the child is asked to draw the light on the paper directly over the aperture through which the light is coming. With his attention directed to the drawing of the light, the instructor helps him to localize the bar image to the left of the light. This may be accomplished by slowly moving the instructor's pencil from the light out to the left side of the onion skin paper, requesting the child to say when the bar image is reached, at which point the bar is drawn on the paper.

The process is then duplicated with the left eye producing another drawing with the bar located to the right of the light. When this has been accomplished satisfactorily the child will be ready to focus both eyes simultaneously on the fixation light while moving the slide in and out and observing the double bar image moving out and in to the right and left of the fixation light. One eye and then the other may be temporarily closed or covered to assist in this process while at all times focused on the fixation light. When the child is able to report seeing one light centered between two transparent bar images it is an indication that he has his two eyes working together and is fusing on the focal point.

The next step is to attempt a simultaneous fusional convergence movement of both eyes. An object such as a star or letter is placed on the slide bar at the user's eye level and held half-way between the fixation light and the nose. He is asked to focus on the fixation light so that in fusing he will see a single pink light and a bar image on either side. He is then asked to change his focus from fixation light to the object on the bar by moving his eyes only. The instructor will notice a slight inward movement of the eyes towards the nose and should observe the absence of any shift when checked objectively with cover and uncover test of either eye. If the convergent movement was a well-coordinated movement and the eyes did not shift, the child in the absence of suppression and with proper fusing taking place will see the object on a single bar with a light image to either side. If unable to do this, further instruction and practice is needed. The child, after initial instruction, may practice these various steps until he is efficient and able to perform the above procedures without failure.

Many other varied exercises can be carried out on this fusion trainer which will help the user to develop and maintain comfortable and efficient single binocular vision.

It will be understood that while a particular preferred embodiment of this fusion training instrument has been shown and described above in detail, numerous modifications thereof might be resorted to without departing from the scope of the invention as defined in the following claims.

What is claimed is:

1. A visual fusion training instrument comprising a chamber having a base, side elements and a single opaque apertured screen; an electric light source in said chamber behind said apertured screen, a support element projecting from said instrument terminating in a headrest for registration with the forehead of the user in central alignment with said apertured screen, an adjustable bar depending from said support movable from a position immediately in front of said apertured screen to a position immediately in front of the nose of the viewer and a viewpiece including means differentially adapted to result in three distinguishable images of said apertured screen when viewed respectively by the right eye alone, the left eye alone, and both eyes together.

2. A visual fusion training instrument as set forth in claim 1 including a variable iris for changing the effective opening of said apertured screen.

3. A visual fusion training instrument as set forth in claim 1 including an electric switch for flashing said light source on and off during use.

4. A visual fusion training instrument as set forth in claim 1 wherein said screen is inclined backwardly from said base and a ledge is provided at the bottom of said screen for holding paper applied thereto.

5. A visual fusion training instrument comprising a screen having a single, localized, viewable object entirely visible to both eyes of a viewer and distinctive means for viewing said object through the respective right and left eyes of the viewer including a viewpiece having means differentially adapted to result in three distinguishable entire images of said entire object when viewed respectively by the right eye alone, the left eye alone, and both eyes together, whereby the relative functioning of said right and left eyes in focusing on said object may be readily determined, and means including the location of said object at a reading distance within arms' length of the viewer adapting said instrument for use with a supplemental, simultaneously viewable focal element which may be manipulated between said object and the viewer.

6. An instrument as set forth in claim 5 wherein said object comprises a common localized light source differentially viewable by either or both eyes of the viewer, said localized light source comprises an opaque screen with a light transmitting aperture therein and a variable iris superimposed on said aperture for manually changing its effective size.

7. An instrument as set forth in claim 5 including a head rest mounted on said instrument adapted to establish a fixed central viewing position relative to said object.

8. An instrument as set forth in claim 5 including a vertically extending rod slidably mounted on said instrument for movement between said object and the nose of the said viewer.

9. An instrument as set forth in claim 7 including a support element for mounting said head rest extending centrally from a position on said instrument above said object and a vertical bar suspended therefrom adjustable between a position adjacent said object and the nose of the viewer.

10. An instrument as set forth in claim 5 including a colored transparent viewpiece interposed between one eye of the viewer and said object.

References Cited
UNITED STATES PATENTS

| | | | |
|---|---|---|---|
| 686,616 | 11/1901 | Johnquest | 351—4 |
| 938,463 | 11/1909 | Cogan | 351—4 |
| 2,280,297 | 4/1942 | Neumueller | 351—39 |
| 3,416,856 | 12/1968 | Humphriss | 351—17 |
| 2,495,263 | 1/1950 | Korb | 351—17 |
| 3,277,888 | 10/1966 | Otwell | 351—2 |

OTHER REFERENCES

Kuhn: "The Cover Test," Opt. Jour. and Rev. Optometry.

"Ophthalmics in Industry," R. J. Fletcher, "The Opticina," July 13, 1956, pp. 660–663.

DAVID SCHONBERG, Primary Examiner

M. J. TOKAR, Assistant Examiner

U.S. Cl. X.R.
350—3, 17, 36